(12) United States Patent
Segal et al.

(10) Patent No.: US 10,387,466 B1
(45) Date of Patent: Aug. 20, 2019

(54) WINDOW QUERIES FOR LARGE UNSTRUCTURED DATA SETS

(71) Applicant: jSonar Inc., Lexington, MA (US)

(72) Inventors: Ury Segal, Vancouver (CA); Ron Ben-Natan, Lexington, MA (US)

(73) Assignee: JSONAR INC., Lexington, MA (US)

( * ) Notice: Subject to any disclaimer, the term of this patent is extended or adjusted under 35 U.S.C. 154(b) by 575 days.

(21) Appl. No.: 15/147,126

(22) Filed: May 5, 2016

(51) Int. Cl.
*G06F 16/00* (2019.01)
*G06F 16/33* (2019.01)
*G06F 16/31* (2019.01)
*G06F 16/38* (2019.01)

(52) U.S. Cl.
CPC .......... *G06F 16/334* (2019.01); *G06F 16/316* (2019.01); *G06F 16/381* (2019.01)

(58) Field of Classification Search
CPC ......... G06F 17/30634; G06F 17/30657; G06F 17/30613; G06F 17/30011; G06F 16/334; G06F 16/316
USPC ................................ 707/769, 736, 737, 741
See application file for complete search history.

(56) References Cited

U.S. PATENT DOCUMENTS

| | | | |
|---|---|---|---|
| 2010/0169311 A1* | 7/2010 | Tengli | G06F 17/30864 707/736 |
| 2015/0213631 A1* | 7/2015 | Vander Broek | G06T 11/206 345/589 |
| 2017/0212955 A1* | 7/2017 | Ben-Natan | G06F 17/30908 |

* cited by examiner

*Primary Examiner* — Thu Nguyet T Le
(74) *Attorney, Agent, or Firm* — Armis IP Law, LLC (57) ABSTRACT

A query engine for an unstructured database satisfies window based queries and analytics by defining a window of documents, and performing analytics on the window using a default value for omitted field. A tabular index containing only values needed for analytics and document ordering defines each window. The tabular index includes all fields from each document that are required to satisfy the query, retrieved on a single pass by the query engine so that multiple fetches to the same document are avoided. Since each document in the window need not contain all the same fields as the other documents, an adapter includes logic for defining a default or placeholder value for a field called for in an analytic computation but nonexistent in a particular document. By retrieving only the computationally relevant fields, and by performing the retrieval only once on each document, the I/O overhead is greatly reduced.

17 Claims, 5 Drawing Sheets

WINDOW QUERIES FOR LARGE UNSTRUCTURED DATA SETS

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions.

Unstructured and semi-structured databases are gaining popularity because they permit analytical analysis with relaxed type and inclusion rules common in traditional tabular databases. In contrast to rigidly structured databases, unstructured databases permit loosely defined collections of data to aggregate data values according to named fields without imposing data type or inclusion restrictions on each documents or records included in the collection. Typically, unstructured databases take the form of a collection of documents defined according to a possibly hierarchical arrangement of subdocuments, such that each document includes one or more fields. The collections may be expressed as scripted text and syntax such as JSON (Javascript Object Notation), which permits each data collection to be human readable and editable via a standard ASCII text file. The unstructured nature also permits substantially large collections of data since each document need not conform to other documents in terms of field membership.

SUMMARY

A query engine and interface to an unstructured database satisfies window based queries and analytics by defining a window of documents based on an extracted sort field, and performing analytics on the window using a substitute or default value for fields omitted from a document in the window. A tabular index containing only values needed for analytics and document ordering is employed to define each window. The tabular index includes all fields from each document that are required to satisfy the query, retrieved on a single pass by the query engine so that multiple fetches to the same document are avoided. Since each document in the window need not contain all the same fields as the other documents, an adapter includes logic for defining a default or placeholder value for a field called for in an analytic computation but nonexistent in a particular document. By retrieving only the computationally relevant fields, and by performing the retrieval only once on each document, the I/O overhead is greatly reduced. Adaptors that define default values in the absence of document fields avoids hindering analytics based on non-conformance some documents. Also, partitioning the data collection into chunks and groups allows analytics to be performed on collections larger than the memory size of the query engine.

Configurations herein are based, in part, on the observation that conventional approaches to a query retrieval window operations provides a powerful tool to generate subranges or "drill down" results from a single query. Unfortunately, conventional approaches to window based query functions suffer from the shortcoming that rigid data typing is typically required to deterministically define the window of data and compute desired functions on the windowed data. Such highly structured typing is typically found in relational databases, due to the highly structured tabular format of tables and fields required in the relational database arrangement. Configurations disclosed herein, however, substantially overcome the above-described shortcomings of conventional window operations by extending a window operation to unstructured and semi-structured databases. Unstructured databases often allow substantially larger data sets than their relational counterparts. A collection of documents in an unstructured or semi-structured database avoids strict typing of fields and allows omission of fields in documents such that named fields need not occur in every document in a collection. An adapter defines a default or null value for omitted window fields, and bucket logic maintains subsets of the full data collection such that only relevant portions of windowed documents need to be loaded in memory at a time, allowing windowed queries on data collections substantially larger than the native memory of the querying machine.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below implement a window function for query requests in very large databases such as unstructured and semi-structured databases. Since unstructured databases such as JSON repositories have relaxed inclusion and type rules, they cannot leverage the field conformance that relational query engines enjoy. A window function performs a calculation across a set of table rows that are somehow related to the current row. This is comparable to the type of calculation that can be done with an aggregate function. But unlike regular aggregate functions, use of a window function does not cause rows to become grouped into a single output row—the rows retain their separate identities. Behind the scenes, the window function is able to access more than just the current row of the query result. The configurations below extend this capability to the unstructured realm of "big data" by accommodating the size and field conventions in such databases.

Figure 1:
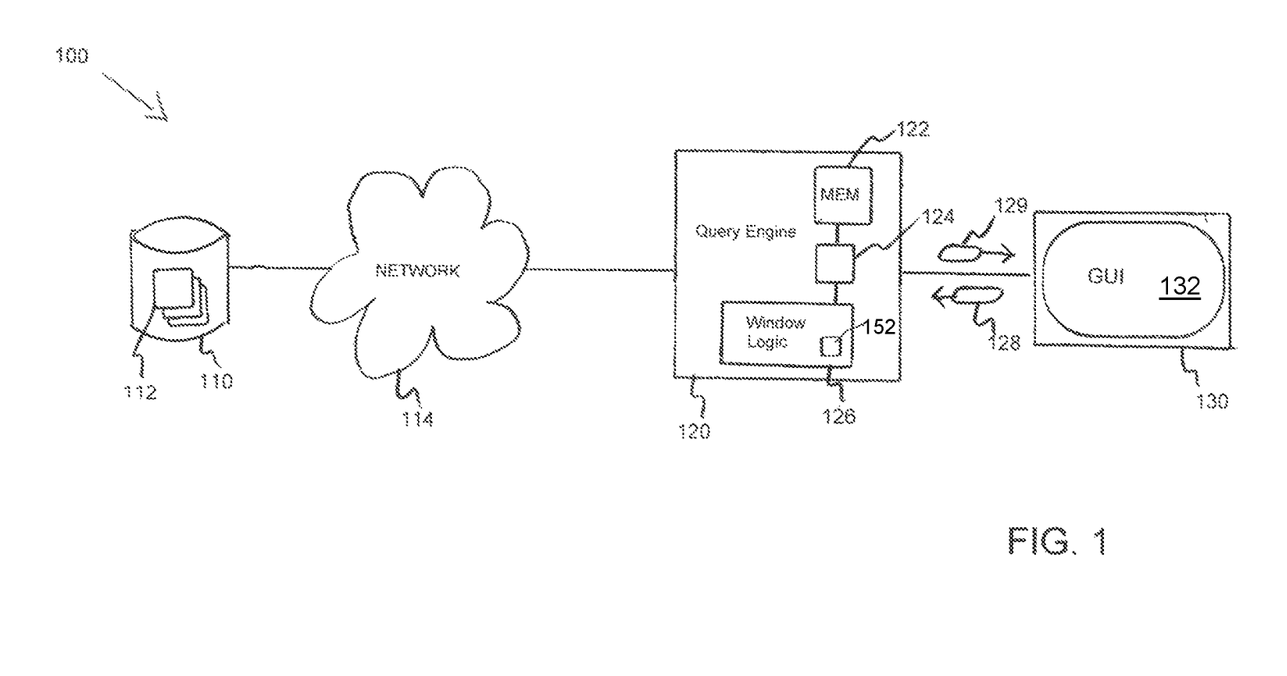
FIG. 1 is a context diagram of a data retrieval environment suitable for use with configurations herein.

FIG. 1 is a context diagram of a data retrieval environment suitable for use with configurations herein. Referring to FIG. 1, in the data retrieval environment 100, an unstructured or semi-structured database 110 includes at least one collection 112, or data set including a plurality of documents. The documents each include one or more fields having field values, however there is no mandatory inclusion of fields or field types, so named fields occurring in one document need not appear in other documents, and if appearing, need not have the same type in each occurrence. However, fields may and often do occur across multiple documents, and the operations and methods disclosed herein employ the names of the fields in gathering the field values across the documents. Documents may also be nested within other documents, exhibiting a hierarchical field structure. An example configuration employs a JSON (JavaScript Object Notation) file, however any suitable file format may be employed.

A query engine 120 communicates with the database 110 for receiving the collection 112 via an electronic network such as the Internet 114 or other suitable communication path. The query engine 120 includes a memory 122, a processor 124 and window logic 126 including instructions executable by the processor for performing a window based query on the collection 112, as discussed in further detail below. A query 128 is receivable from a rendering device 130 via a graphical user interface 132, and specifies analytical values sought by the query 128 based on fields in documents, window criteria, adaptors for handling omitted or differently typed fields, and operations to be performed on the documents to compute and/or extract the analytical values. The query engine 120 then renders a query response 129 including the analytical values via the rendering device 130.

In the discussion that follow, the following terms are often employed. A data collection refers to a set of documents in an unstructured or semi-structured database, such as a JSON database.

Analytic values are values sought from a data set or data base resulting from computations performed on the data in the data set, and are more generally referred to as output values.

Fields are labels, or names, of data values in the data set and used to refer to commonly labels fields across multiple documents in a data set all having the same field name.

Filed values refers to data values stored in a field.

Groups refer to a subset of documents in a data set or collection based on a common property, typically a value or range in one or more of the fields of each document.

Window refers to a sorted sequence of documents in a collection or group defined by a relation and sort key, and may include any number of sorted documents before and after a current document based on the relation.

Figure 2:
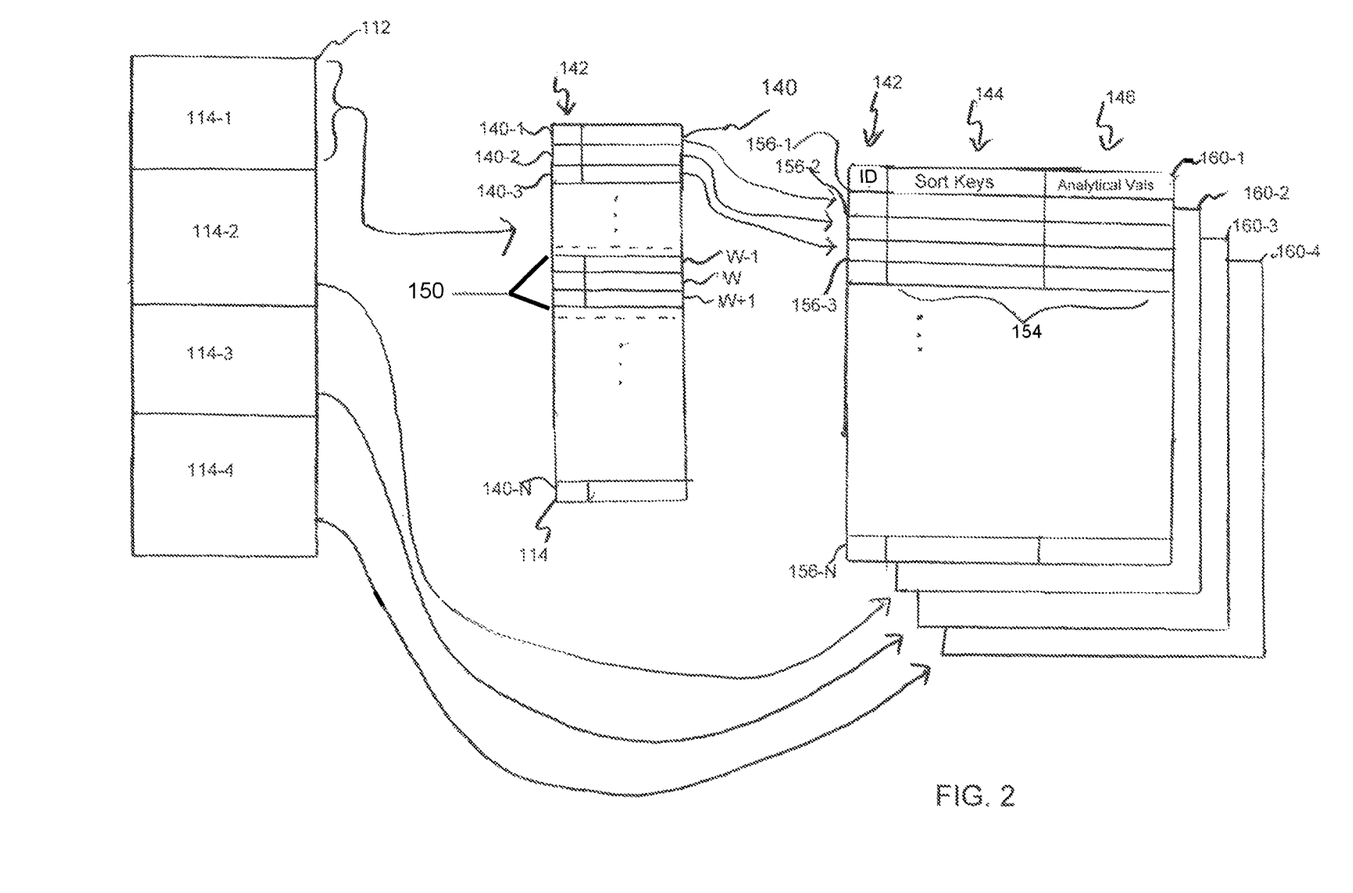
FIG. 2 is a block diagram of data flow and processing a window based query in the environment of FIG. 1.

FIG. 2 is a block diagram of data flow and processing a window based query in the environment 100 of FIG. 1. Referring to FIGS. 1 and 2, in the data retrieval environment, the query engine 120 receives one or more collections 112 from the database 110. In the data retrieval environment 100, large data sets, or collections 112, perhaps too large to be stored in the memory 122, are processed responsive to the query request 128 based on a window 150 of data partitioning the set of documents 140-1 . . . 140-2 (140 generally) from the unstructured or semi structured data collection into groups 114-1 . . . 114-4 (114 generally) based on a property of the respective document, such that all documents in a group 114 have a common property. Each document 140 in a semi- or unstructured database has fields containing field values, but individual documents 140 are not bound to necessarily contain similarly named fields, or even similarly typed fields, as the other documents in the group. The groups 114 may be based on a field value, on a creation time of the document, or other criteria for subdividing the collection 112 into smaller "chunks." Alternatively, the entire collection 112 may be considered a single group 114 if memory permits.

In contrast to conventional approaches, where strong typing and field delimitation values impose a standard of consistency across each record in a table of records, relaxed type and inclusion rules permit analytical analysis of extremely large databases where some documents do not conform. During iteration through each document 140 in a group 114, the window logic 126 identifies and retrieves a document ID, sort keys used in determining the window, and report fields used in computing the desired analytical values.

The window function performs a calculation across a set of table rows that are related to the current row. This is comparable to the type of calculation that can be done with an aggregate function. But unlike regular aggregate functions, the use of a window function does not cause rows to become grouped into a single output row—the rows retain their separate identities. During window related computations, the window function is able to access more than just the current row of the query result.

The window logic 126 iterates through each document 140 in each group identifying, for each document, a window 150 of other documents 140-(W+1), 140-(W−1), etc. in the group 114 contributing to a computation of an analytic value sought from processing the large data set defined by the collection 112. The window 150 differs from the group 114 delineation of documents, or records, because the window is based on a consecutive sequence of documents according to a sort key, and includes a number of consecutive documents before and after each document. The window 150 may vary for each document 140, as a kind of "sliding" reference through iteration of the documents.

The window logic 126 retrieves, during the iteration, values from fields 154 employed in the computation of the sought analytical values for any of the documents 140 in the group 114 such that each document in the group is accessed only once for retrieval of the employed fields. As the window logic 126 traverses or parses each group 114, therefore, it identifies and retrieves any fields that are employed for either the window computation or the analytical values that comprise the query output 129. Repeated accesses to documents of the collection 112 are avoided, as well as I/O for unused document fields.

For the sort keys 144 and the report fields 146 for analytical values, the window logic 126 stories the retrieved values 154 in a tabular form in a table 160 for computation of the analytic values while substituting an alternative value for employed fields omitted from a corresponding document. Since the documents 140 are unencumbered from rigid field inclusion and data typing, the query 128 defines an adaptor 152 that defines a default or alternative value for referenced fields. The received query 128 specifies the use of an adapter 152 to supply an omitted or missing field in a computation of calculation that would otherwise require one. For example, in the case of an analytical value computation involving an average, the adaptor may specify that an omitted value is not take into account in computing the average.

The table 160 may take a variety of forms, depending on the size and number of fields that need to be retrieved. A relational table such as a SQL, or SQLite table is usually preferable for fast indexing with sufficient space, however a memory resident table 160 may suffice if the collection 112 is not prohibitively large.

From the fields employed in computing the output 129 (the sort keys 144 and report fields 146), the table 160 stores the retrieved values 154 and a document ID 142 from the group 140. The utilized retrieved values 154 are therefore stored in indexed table 160 for efficient processing of the window 150 for each document 140 represented as an entry 156-1 . . . 156-N (156, generally) in the indexed table 160-1 . . . 160-N (160 generally).

Figure 3A:
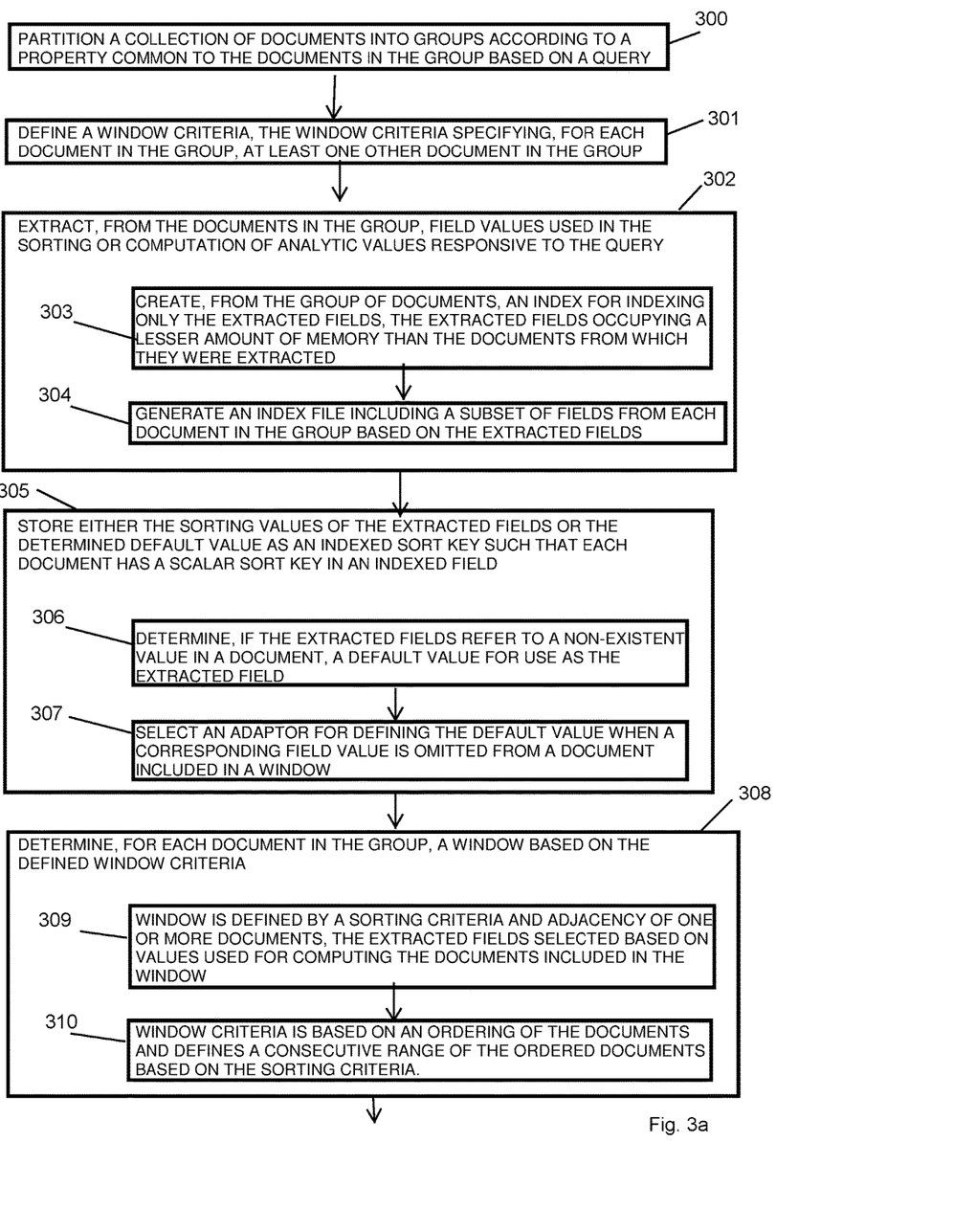
FIGS. 3a-3c are a flowchart of window processing by the window logic in the environment of FIG. 1.
Figure 3B:
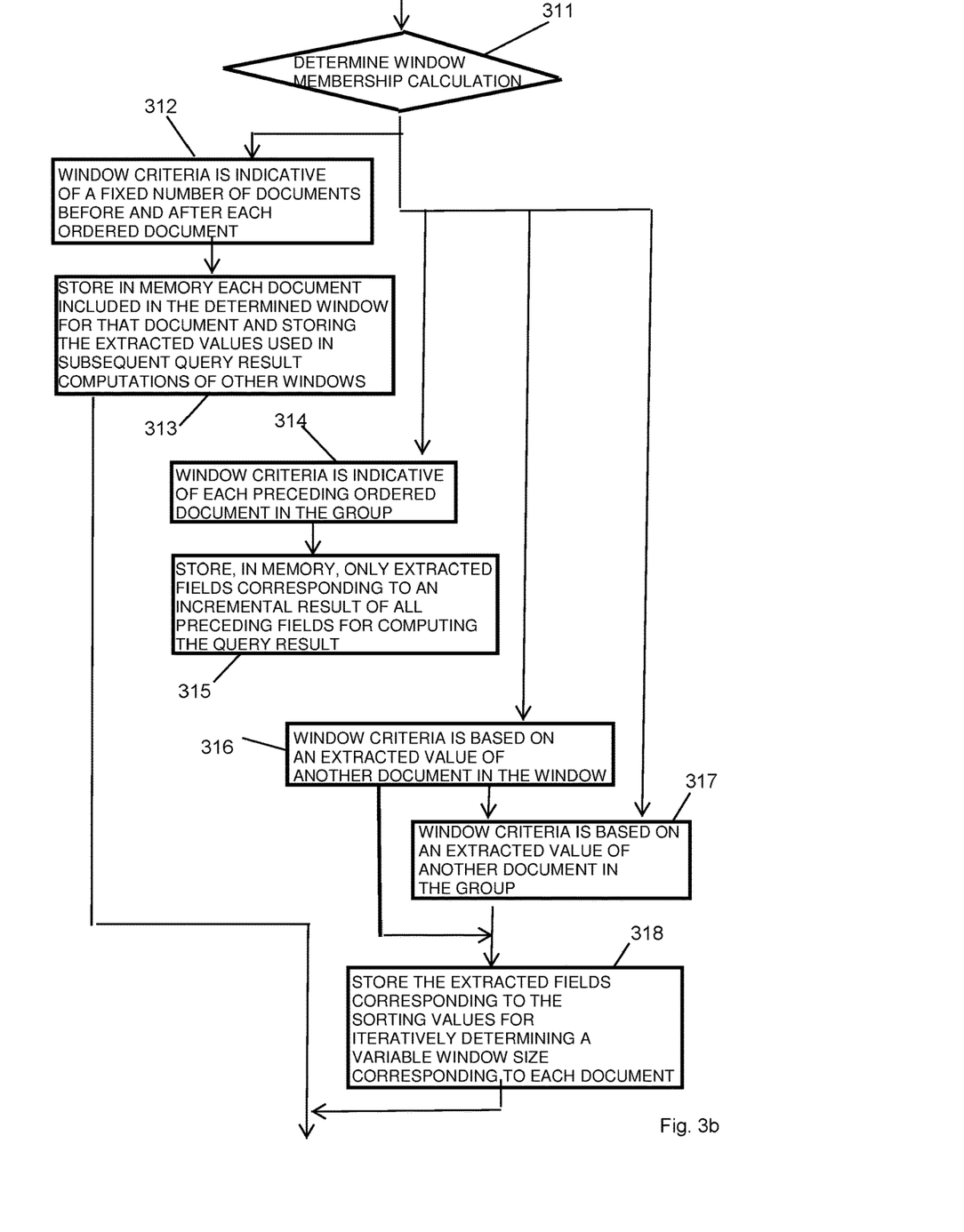
Figure 3C:
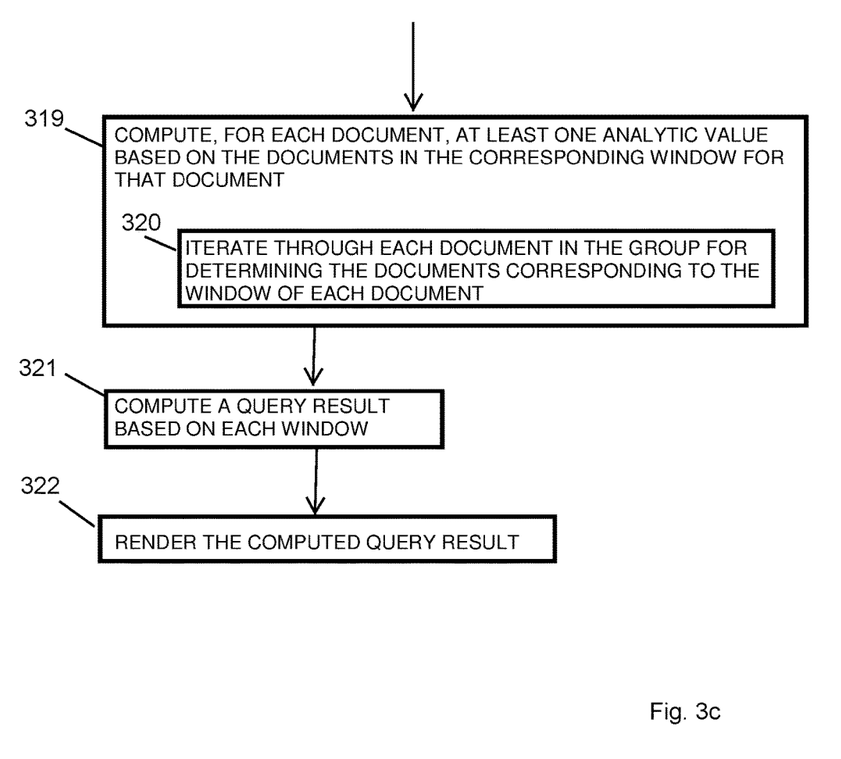

FIGS. 3a-3c are a flowchart of window processing by the window logic in the environment of FIG. 1. Referring to FIGS. 1-3c, in the semi-structured data retrieval environment 100, the collections 112 of data may exceed a computer memory size of a computer responsive to a query on the collection 112. The method of performing a windowed query as disclosed herein includes, at step 300, partitioning a collection 112 of documents 140 into groups 114 according to a property common to the documents in the group 114 based on a received query request 128. The window logic 126 defines a window criteria specifying, for each document in the group, at least one other document in the group, as depicted at step 301. The window logic 126 extracts, from the documents 140 in the group 114, field values, or retrieved values 154, used in the sorting or computation of analytic values responsive to the received query 128, as disclosed at step 302. Only the fields designated by the query 129 as significant to either the sort fields for the window or fields used in calculation of analytical values for query output need to be extracted. These fields define the retrieved values 154 stored in the table for satisfying the query request 128. This relieves the query engine 120 from retrieval off entire documents, which could require substantial memory in a large data collection 112.

The window logic 126 creates, from the group 114 of documents, an index for indexing only the extracted fields, such that the extracted fields 154 occupy a lesser amount of memory than the documents 140 from which they were extracted, as shown at step 303. The index is used for generating an index file 160 including a subset of fields from each document 140 in the group 114 based on the extracted fields, thus leaving unused fields separate so as to mitigate memory demand, as depicted at step 304.

In particular configurations, an additional check may be performed at step 304 to compute or estimate memory demands of the index file 160. If the group size and extracted fields 154 permit, a memory resident table 160 may be employed rather than an indexed file such as a relational SQL table. If particular groups 114 are sufficiently small, it may be beneficial to avoid table creation on disk or non-volatile storage, and therefore some index files 160-n may result in a memory representation.

The window logic 126 stores either the sorting values of the extracted (retrieved) 154 fields or the determined default value from the adaptor 152 as an indexed sort key such that each document 140 has a scalar sort key in an indexed field, as shown at step 305. The adaptor 152 defines values employed in the case of an omitted or type differentiated value in a field designated for sorting or computation. Adaptor usage includes determining, if the extracted fields refer to a non-existent value in a document, a default value for use as the extracted field, as disclosed at step 306, and selecting an adaptor 152 for defining the default value when a corresponding field value is omitted from a document included in a window 150, as depicted at step 307. The index file 160 is generally operable to store the extracted fields in a tabular form for efficient handling, and may take the form of a relational table to facilitate fast indexing. Since the extracted fields are generally substantially less voluminous than their document counterparts, relational processing is performed on the selected subset represented by the extracted fields. Having the sort keys 144 in an indexed arrangement, the window logic 126 determines, for each document 140 in the group, a window 150 based on the defined window criteria, as shown at step 308. In the example of FIG. 2, the window 150 is defined by a sorting criteria and adjacency of one or more documents 140, using extracted fields selected based on values used for computing the documents included in the window 150, as depicted at step 309. The window logic 126 uses the sort keys, which may include adaptor 152 supplied values, to compute a window criteria based on an ordering of the documents and which define a consecutive range of the ordered documents based on the sorting criteria, as shown at step 310.

Since each document 140 has a specific window, and since the window may depend on field values of other documents, other entries 156 in the group may be referenced with respect to the window 150. A check is performed, at step 311, to determine window membership. At step 312, if the window criteria is indicative of a fixed number of documents before and after each ordered document, then the window logic 126 stores, in memory 122, each document (or corresponding entry 156) included in the determined window 150 for that document and stores the extracted values used in subsequent query result computations of other windows 150. Since the window includes a determined set of entries 156 in the indexed file 160, analytical values used in output computation are immediately available.

If the window criteria is indicative of each preceding ordered document in the group, as shown at step 314, then the window logic 156 stores, in memory, only extracted fields corresponding to an incremental result of all preceding fields for computing the query result, as disclosed at step 315.

If the window criteria is based on an extracted value of another document in the window, as shown at step 316, then the window logic 126 stores the extracted fields corresponding to the sorting values for iteratively determining a variable window size corresponding to each document 140, as depicted at step 318. Therefore, the window depends on values of other documents in the window. Similarly, if the window criteria is based on an extracted value of another document in the group, as shown at step 317, control passes to step 318 to compute the values from the corresponding entries 156 in the group file 160.

Once the window membership for each entry 156 (i.e. for each document) is determined, the window logic 126 may compute, for each document 140, the analytic values based on the documents in the corresponding window for that document, as depicted at step 319. The window logic 126 iterates through each document in the group for determining the documents corresponding to the window of each document 140, as shown at step 320. The query engine 120 computes the query result 129 based on each window 150, as disclosed at step 321, and the rendering device 130 renders the computed query result, as depicted at step 322.

An example of window processing as performed by the window logic 126 follows. Suppose there exists a collection 112 of a large amount of N documents 140 of unspecified structure. The window logic 126 groups them by a given property of the document, and for each group, sorts the document by some sort key. The, for each document in each group, the window logic calculates analytical values that depends on the document and on other documents coming before and/or after it in the group. Such documents define a window to the group for that document. Different documents in the group each have different windows. The selection of the documents in the group may depend on the document you calculate for or be fixed (e.g. 2 before and 2 after the document you calculate for).

Window Logic Sequence:
1. Divide the N documents to C chunks. For each chunk, group the document by some property. Each document 140 will be assigned a group identifier (GID). For each document in the chunk, extract from the document all the data necessary to calculate the analytical values and the data necessary to calculate the sort keys. Also extract data necessary to calculate which other documents 140 will be member of the window 150. Since the documents have no predefined structure, the data can be missing, in which case a special value called NULL will be used. Also note the data extracted does not have to be a singular value, such as a number. It can be any data in any format or size.
1. If the GID appears for the first time, create an SQL table named G_GID and save in it the document ID as primary key and the data extracted above.
2. Else, save the document ID as primary key and the data extracted above in the table G_GID, shown as indexed file 160.
2. When all the chunks were calculated, go over all the groups. For each group,
1. Create an SQL INDEX over the G_GID table, ordered by the Sort Keys.
2. calculate the necessary window. There are four types of windows. For each type, we describe the process to create the window below.
   a) Windows that start at the start of the group and go up to the document we calculate for.
   b) Windows that stretch from a fixed number of documents before to a fixed number of documents after the document we calculate for. The numbers are independent of the document.
   c) Windows that stretch from a variable number of documents before to a variable number of documents after the document we calculate for. The numbers depend on the document we calculate for.
   d) Windows that stretch from a variable number of documents before to a variable number of documents after the document we calculate for AND on the other documents in the group, possible all of them
3. drop the SQL Index.
3. For each document, and the window just calculated in the previous step, calculate the final analytical values. The calculation depends on the values of the documents and the values of the other documents in the window saved in the G_GID table. Write the result of the function to output.
4. Delete the table G_GID The four windows membership calculation approaches mentioned above are:

a). Windows that start at the start of the group and go up to the document we calculate for.

Read from G_GID line by line. If the calculation requires all values up to this line to be known, store in RAM as n-tuples the content of the line, that is, the document ID, the values used to sort and the values used to calculate the analytical values. Now all the information from all the documents in the window are in RAM and the function value can be calculated. Note it is not always necessary to save any information. For example, when calculating the maximum value, you only need to store the maximum value seen so far, as the window contain all the documents up to this point. For other calculations, it is necessary to save all the data.

b). Windows that stretch from a fixed number of documents before to a fixed number of documents after the document we calculate for, where the numbers are independent of the document.

Suppose the window is composed of x documents before and y documents after each document. Read the lines one by one from G_GID, and store all data as in case (1) above. When we have x+y+1 documents, we can produce the output for the first document, and we can free memory used by the older documents. We never need to hold more than x+y+1 n-tuples in RAM.

c). Windows that stretch from a variable number of documents before to a variable number of documents after the document we calculate for, where the numbers depend on the document we calculate for.

In this case we read all lines from G_GID and save all the data in n-tuples in RAM. Then we can iterate over the tuples, calculate the window size and then the final analytical function values.

d). Windows that stretch from a variable number of documents before to a variable number of documents after the document we calculate for AND on the other documents in the group, possible all of them Similar to case 3, but we also need to save in the n-tuples the value of the sort keys. Read all lines from G_GID and save all the data and the sort keys values in n-tuples in RAM. Then we can iterate over the tuples, calculate the window size based on the sort keys, and then the final analytical function values Conventional windowing functions were only used in RDBMS (Relational Database Management Systems). With large amount of unstructured documents, there are several issues using windowing functions solved by configurations herein.
1. The data for the calculated functions to work on may exist only in some of the documents, and its type might not be relevant to the function. For example, you cannot take an average of a structure.
2. The order of the document in the window may depend on data that might not exist in all documents, or the data may be of several types so it makes no sense to call one bigger than the other. For example, a geo location is not bigger or smaller than a date.
3. There is so much data that it is not feasible to use RAM to note which document belong to which group or hold in RAM the document data needed to calculate the analytical function value for even one window.
4. The nature of the analytical functions can be different. For example, if each document represent an insurance customer, with all his policy, claims, payments, and personal details, you might want to find how many claims he had, compared to people in his age and postal code, on his home policy; while there is no assurance that a customer ever had a claim or a home policy at all. But if he had—then you would like to produce this statistic. In this case, the analytical functions are concerned with the property of the structure of the documents.

Configurations herein emphasize properties of documents, and not discrete values. Because the data is so big, it is beneficial to extract from the documents only the necessary data, and store it temporarily on a fast SSD for processing. We sort the document by first grouping together document whose sort key can be compared. We save the input to the analytical function as unstructured data so that structure-aware analytics can be performed. We group the documents by chunks and save the grouping result on SSD so we can group and number of documents. We calculate the value of the analytical functions using stream-fed algorithms so that we don't need to hold in RAM all of the data of documents in the group. Lastly, by always keeping reference to the document analyzed, analytical functions can examine the structure can be calculated. In RDBMS windowing solutions, analytical function cannot "link back" to other tables that may denote the overall structure of the data.

TABLE I

```
$analyze:
[
{
win_var_name: {$ <analytic_func1>: [arg,arg,. . .] | $<analytic_func1>:1},
win_var2_name: 1$<analytic_func2>:[arg,arg,. . .] | $<analytic_func2>:1},
$over : over-syntax,
},
{
win_var3_name: { $<analytic_func3>: [arg,arg,...] | $<analytic_func3>:
1 },
win_var4_name: {$<analytic_func4>: [arg,arg,...] | $<analytic_func4>:1},
    $over : over-syntax,
    },. . .
    ],
    $having: { find-syntax-selection }
    }
    over-syntax:
    $over: {
    $partitionBy: grouping-specifier, // If omitted, all docs are one window
    $orderBy : [ [sort_expr,-1|1] , . . .], //If omitted, random order. If one
key, no nested array needed
    $rows|$range:[  // if omitted, range is from start to current doc
    <expr|$unbounded>,//if omitted, preceding is unbounded
    <expr|$unbounded>//if omitted, bound by current doc
    ]
    }
```

Table I shows a syntax format for a window based query request 128 receivable by the query engine 120. Table II shows a Syntax example of a query to compute a rolling average of quantities sold by date; order the result by date ID and sales ID.

TABLE II

```
select salesid, dateid, sellerid, qty,
avg(qty) over
(order by dateid, salesid rows unbounded preceding) as avg
from winsales
order by 2,1;
    {$windows: {
    avg: {
    $avg: ["$qty"],
    $over: {
    $orderBy : [{dateid:1}, salesid:1 ],
    }
    }
    }
} },{$project: {salesid:1, dateid:1, seller_id:1, qty:1, avg: 1}}, {$sort:
{ dateid:1,
salesid: 1}}
```

| salesid | dateid | sellerid | qty | avg |
|---|---|---|---|---|
| 30001 | 2003 Aug. 02 | 3 | 10 | 10 |
| 10001 | 2003 Dec. 24 | 1 | 10 | 10 |
| 10005 | 2003 Dec. 24 | 1 | 30 | 16 |
| 40001 | 2004 Jan. 09 | 4 | 40 | 22 |
| 10006 | 2004 Jan. 18 | 1 | 10 | 20 |
| 20001 | 2004 Feb. 12 | 2 | 20 | 20 |
| 40005 | 2004 Feb. 12 | 4 | 10 | 18 |
| 20002 | 2004 Feb.16 | 2 | 20 | 18 |
| 30003 | 2004 Apr. 18 | 3 | 15 | 18 |
| 30004 | 2004 Apr. 18 | 3 | 20 | 18 |
| 30007 | 2004 Sep. 07 | 3 | 20 | 19 |

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a semi-structured data environment having collections of data exceeding a computer memory size of a computer responsive to a query on a collection, a method of performing a query, comprising:
  partitioning a collection of documents into groups according to a property common to the documents in the group based on a received query;
  defining a window criteria, the window criteria specifying, for each document in the group, at least one other document in the group;
  extracting, from the documents in the group, field values used in the sorting or computation of analytic values responsive to the received query, the window defined by a sorting criteria and adjacency of one or more documents, the extracted fields selected based on values used for computing which documents to include in the window;
  creating, from the group of documents, an index for indexing only the extracted fields, the extracted fields occupying a lesser amount of memory than the documents from which they were extracted;
  selecting an adaptor for defining a default value when a corresponding field value is omitted from a document included in the window, the default value for use as the extracted field;
  determining, for each document in the group, a window based on the defined window criteria;
  computing, for each document, at least one analytic value for satisfying a response to the query based on the documents in the corresponding window for that document;
  iterating through each document in the group for determining the documents corresponding to the window;
  computing a query result based on each window; and
  rendering the computed query result.

2. The method of claim 1, wherein the window criteria is based on an ordering of the documents and defines a consecutive range of the ordered documents based on the sorting criteria.

3. The method of claim 2 wherein the window criteria is indicative of a fixed number of documents before and after each ordered document.

4. The method of claim 3 further comprising storing in memory each document included in the window for that document and storing the extracted values used in subsequent query result computations of other windows.

5. The method of claim 2 wherein the window criteria is indicative of each preceding ordered document in the group.

6. The method of claim 5 further comprising storing, in memory, only extracted fields corresponding to an incremental result of all preceding fields for computing the query result.

7. The method of claim 2 wherein the window criteria is based on an extracted value of another document in the window.

8. The method of claim 7 further comprising storing the extracted fields corresponding to the sorting values for iteratively determining a variable window size corresponding to each document.

9. The method of claim 2 wherein the window criteria is based on an extracted value of another document in the group.

10. The method of claim 1 further comprising
generating an index file including a subset of fields from each document in the group based on the extracted fields;
storing either the sorting values of the extracted fields or the determined default value as an indexed sort key such that each document has a scalar sort key in an indexed field.

11. The method of claim 1 further comprising: retrieving, during the iteration, values from fields employed in the computation of the sought analytical values for any of the documents in the group such that each document in the group is accessed only once for retrieval of the employed fields.

12. A query processing server device, comprising:
a database retrieval memory for storing a partitioned set of documents in an unstructured or semi structured data collection, the partitions defining groups based on a property of the respective document such that all documents in a group have a common property;
a processor based query engine configured to iterate through each document in each group for identifying, for each document, a window of other documents in the group contributing to a computation of an analytic value sought from processing the large data set for satisfying a response to a query, the window defined by a sorting criteria and adjacency of one or more documents, the extracted fields selected based on values used for computing which documents to include in the window;
an index created from the group of documents, the index for indexing only the extracted fields, the extracted fields occupying a lesser amount of memory than the documents from which they were extracted;
an adaptor for defining a default value when a corresponding field value is omitted from a document included in the window, the default value for use as an extracted field,
a tabular repository for receiving, during the iteration, values from fields employed in the computation of the sought analytical values for any of the documents in the group such that each document in the group is accessed only once for retrieval of the employed fields;
the tabular repository adapted to store the retrieved values in a tabular form for computation of the analytic values while substituting an alternative value for employed fields omitted from a corresponding document; and
a rendering device for displaying the computed analytical values.

13. The device of claim 12 further comprising creating, from the group of documents, an index for indexing only the retrieved values, the retrieved values occupying a lesser amount of memory than the documents from which they were extracted.

14. The device of claim 13 further comprising selecting an adaptor for defining the substituted value when a corresponding field value is omitted from a document included in the window.

15. The device of claim 14 wherein the window is defined by a sorting criteria and adjacency of one or more documents, the retrieved fields selected based on values used for computing the documents included in the window.

16. The device of claim 12 further comprising determining if the tabular repository is sufficiently small for storage in addressable memory, wherein the tabular repository stores the retrieved fields in main memory for mitigating input/output operations for identifying the window.

17. A computer program product on a non-transitory computer readable storage medium having instructions that, when executed by a processor, perform a method of performing a query, the method comprising:
partitioning a collection of documents into groups according to a property common to the documents in the group based on a received query;
defining a window criteria, the window criteria specifying, for each document in the group, at least one other document in the group;
extracting, from the documents in the group, field values used in the sorting or computation of analytic values responsive to the received query, the window defined by a sorting criteria and adjacency of one or more documents, the extracted fields selected based on values used for computing which documents to include in the window;
creating, from the group of documents, an index for indexing only the extracted fields, the extracted fields occupying a lesser amount of memory than the documents from which they were extracted;
selecting an adaptor for defining the default value when a corresponding field value is omitted from a document included in the window, the default value for use as the extracted field;
determining, for each document in the group, a window based on the defined window criteria;
computing, for each document, at least one analytic value for satisfying a response to the query based on the documents in the corresponding window for that document; and
iterating through each document in the group for determining the documents corresponding to the window;
computing a query result based on each window; and
rendering the computed query result.

* * * * *